T. FITZGIBBON.
TRACK SWITCH LEVER.
APPLICATION FILED JUNE 20, 1921.

1,412,395.

Patented Apr. 11, 1922.

INVENTOR:
THOMAS FITZGIBBON

PER
Andrew L. Chezam
ATTORNEY

UNITED STATES PATENT OFFICE.

THOMAS FITZGIBBON, OF SHERIDAN TOWNSHIP, SCOTT COUNTY, IOWA.

TRACK SWITCH LEVER.

1,412,395. Specification of Letters Patent. Patented Apr. 11, 1922.

Original application filed August 24, 1920, Serial No. 405,734. Divided and this application filed June 20, 1921. Serial No. 479,117.

*To all whom it may concern:*

Be it known that I, THOMAS FITZGIBBON, a citizen of the United States, residing in Sheridan Township, in the county of Scott, in the State of Iowa, have invented a new and useful Track Switch Lever, of which the following is a specification.

My invention relates to improvements in track-switch-levers which operate in conjunction with car-switch-levers; and the objects of my invention are, first, to provide a track switch lever, installed within a housing, and which will operate, conjunctively actuated by a spring, surrounding the lever, mounted securedly within the housing, and the switch plow of a car-switch lever, to open and close the switch of a railroad track; second, to provide a track switch lever capable of keeping a switch closed, yet so constructed that it may be opened and held open, during the passing of a car, by the car switch mechanism provided upon such car, while the car is in motion; third, to provide a track-switch-lever simple of construction and operation, having a housing capable of protecting it against ice, snow and dirt; fourth, to provide a track switch lever adapted to use in connection with a specific car-switch-lever described in patent application filed by me in the United States Patent Office on August 24th A. D. 1920 and of record under Serial Number 405,734, entitled, "Switching machine."

I attain these objects by the mechanism illustrated in the accompanying drawing, in which:—

Figure 1:
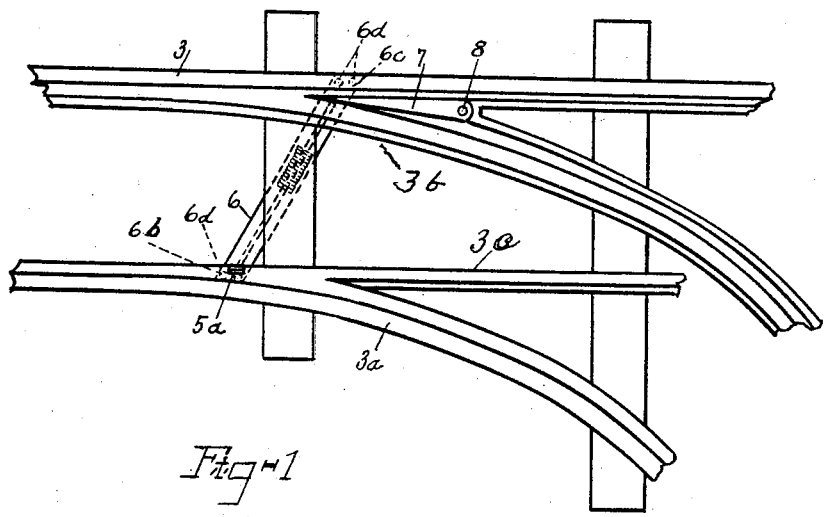
Figure 1, is a plan view of a section of a railroad track disclosing a switch formation, a switch point and in dotted lines a track switch lever, track switch lever housing and the spring means provided therein.
Figure 2:
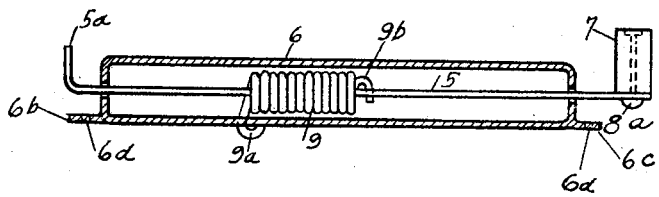
Fig. 2, is a plan view of the track switch lever and in section the track switch lever housing and also disclosing the spring means provided within the housing for holding the switch point closed when at rest.
Figure 3:
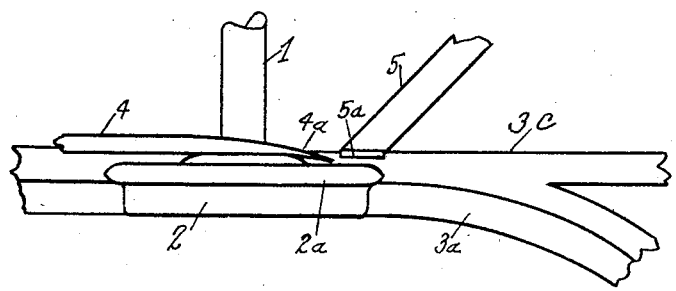
Fig. 3, is a top plan view of a broken portion of the track, track-switch lever, switch plow and truck, disclosing the manner in which the track-switch-lever is operated by the switch plow and illustrating the relative positions of the track-switch-lever, switch plow, truck wheel and switch when the device is approximating action.

Figures 1, 2 and 3 herein correspond to Figures 4, 5, and 6 in my application Serial Number 405,734, above referred to.

Similar numerals refer to similar parts throughout the several views herein.

My invention is essentially a track mechanism, but is specifically designed for cooperation with car mechanism, so that neither mechanism will function without the other, to the extent of furnishing the desired result.

Numerals 1 and 2 respectively represent the axle and wheel of an ordinary railway car truck, not fully shown, while 4 represents a switch plow which is suspended from such car truck by mechanism not shown, but by which, such switch plow 4 may be raised or lowered at the will of the operator of the car or truck by mechanism known as car switch levers, not shown.

Numeral 5 represents the track-switch-lever, and in construction is a rod which passing beneath frog $3^b$ at a point near the crotch of the frog is secured at one end by any suitable means, preferably by bolt $8^a$ to switch point 7, and is laid in a suitable direction across the track and housed in a conformable housing 6 of any suitable material, preferably a pipe.

Lever 5 has its free end right angularly flanged at $5^a$, which flange $5^a$ extends perpendicularly suitably high enough to admit of contact with switch plow 4 when the same is lowered in action, thus causing the lever 5 to actuate and in actuating to move the switch point 7 vibratorily.

To facilitate the movement longitudinally of track switch lever 5 I have provided around it, and within the housing 6, a coil spring 9, which coil spring 9 I secure at one of its ends by bent eye means $9^b$ bent in such end, through a hole (not shown) in track switch lever 5, and at its other end by like bent eye means $9^a$ in a hole (not shown) in the wall of the housing 6, which coil spring 9 is so arranged that its contraction causes track switch lever 5 to hold switch point 7 closed against the frog $3^b$, unless it is opened by the co-operative action of switch plow 4 upon the angulate end $5^a$ of lever 5, but in which instance, upon the switch plow 4 passing beyond the switch, it is closed by the contractive action of the spring 9 drawing the point 7 to the side of the frog $3^b$ again.

The track switch lever housing 6 is provided at either end with suitable flanges 6$^b$ and 6$^c$ for securing the said housing 6 in position, and this is accomplished by permitting the flanges 6$^b$ and 6$^c$ to pass beneath the rails 3 of the track, unto which rails the housing is secured by bolt means (not shown) through holes 6$^d$, in such flanges and rails.

It will be observed that the housing 6 being a pipe, by its nature affords protection to the track switch lever 5 and spring 9 from obstruction by snow, ice and dirt.

It is understood that the track switch lever may be operated by other forms of car switch levers than that illustrated herein.

In operating track switch lever 5 by the car switch lever mechanism embodied in switch plow 4, the switch plow 4 is lowered to the side of rail 3$^c$ adjacent flange 5$^a$ when the truck wheel 2 approaches the switch 3$^a$ as shown in Fig. 3, permitting the point 4$^a$ of switch plow 4 to intervene between flange 2$^a$ of wheel 2 and the flange 5$^a$ of the track switch lever 5, when by the progress of the truck the switch plow 4 is forced against the flange 5$^a$, forcing the track switch lever to actuate, and the track switch lever 5 being secured at its other end to switch point 7, the switch is forced open and the car or truck wheel 2 enters the switch.

I claim,

In a switching machine; a track switch lever having a housing, said lever capable of being secured at one end to a switch point, its other end angulated, hole means spaced between the ends of the track switch lever suited for attachment of spring means; a track switch lever capable of being secured at one of its ends to a switch point, having a centrally disposed spiral spring thereon, secured thereto by hole means between its ends; the housing disposed about the track switch lever said housing being capable of being secured to the rails of a track, flange means disposed upon either end of the housing suited for securing said housing to the rails of a railroad track, hole means in the wall of said housing suited to the securing of a spiral spring connectedly between the said housing and the track switch lever, the track switch lever being installed within the said spring and both spring and track switch lever being installed within the housing.

All for the purposes specified.

Davenport, Iowa, June 14th A. D. 1921.

THOMAS FITZGIBBON.

Witnesses:
WILLIAM W. BAILEY,
C. R. NORTHRUP.